No. 848,805. PATENTED APR. 2, 1907.
F. BRYER.
SLED RUNNER.
APPLICATION FILED JUNE 7, 1906.
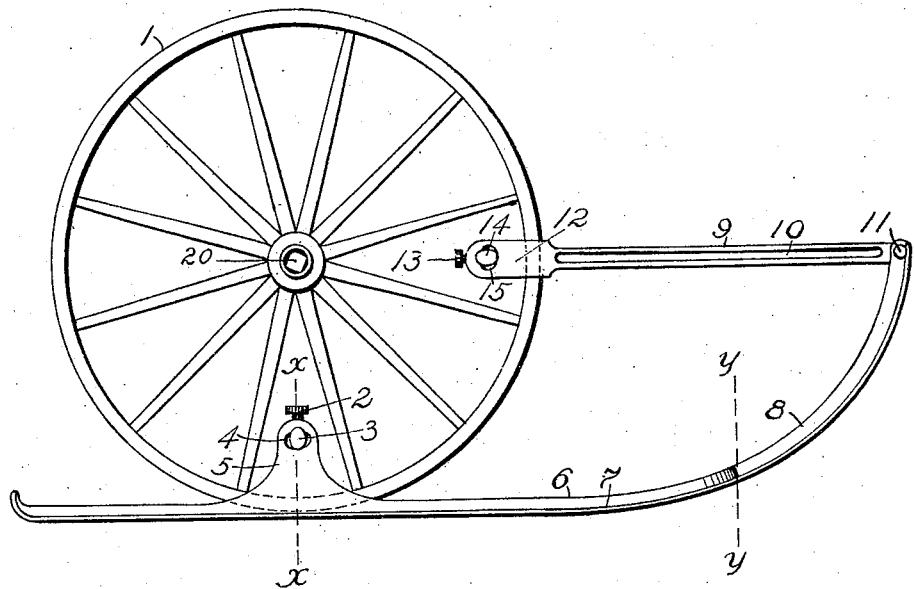
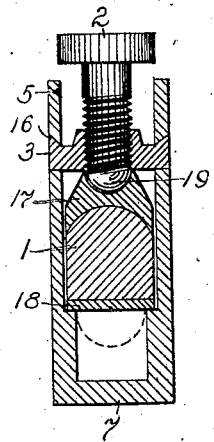
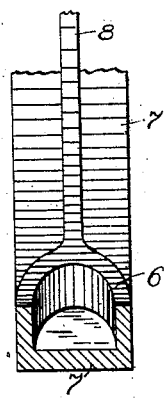
Inventor
Frank Bryer,
by
G. C. Kennedy, Attorney
Witness
M. Kennedy
C. M. Jensen
THE NORRIS PETERS CO., WASHINGTON, D. C.

UNITED STATES PATENT OFFICE.

FRANK BRYER, OF WATERLOO, IOWA, ASSIGNOR OF ONE-HALF TO MICHAEL JACKMAN, OF WATERLOO, IOWA.

SLED-RUNNER.

No. 848,805.      Specification of Letters Patent.      Patented April 2, 1907.

Application filed June 7, 1906. Serial No. 320,492.

*To all whom it may concern:*

Be it known that I, FRANK BRYER, a citizen of the United States of America, and a resident of Waterloo, Blackhawk county, Iowa, have invented certain new and useful Improvements in Sled-Runners, of which the following is a specification.

My invention relates to sled-runners; and the object of my improvement is to provide proper means for attaching a light runner to a vehicle-wheel so arranged as to be easily put on or off at will.

This object I have accomplished by the means which are hereinafter described and claimed and which are illustrated in the accompanying drawings, in which—

Figure 1 is a side elevation of my improved sled-runner as attached to the wheel of a vehicle in correct operative position. Fig. 2 is a full-size cross-section of the fastening means, taken on the line $x\,x$ in Fig. 1; and Fig. 3 is a full-size cross-section of the runner, taken on the line $y\,y$ in Fig. 1.

Similar reference-numerals refer to similar parts throughout the several views.

1 represents a wheel rotatably mounted on the axle 20 of any description of vehicle, as usual.

I have shown in Fig. 1 a sled-runner composed of a tread 7, having a vertical web 8, said web being single at the curved forward portion, but bifurcated at the bend to form a double web 6, extending to the heel of the runner.

At a point vertically below the axle 20 each of the webs 6 are extended upward to form two parallel vertical uprights 5. The space between said uprights 5 is made sufficient to permit the introduction thereinto of the felly and tire 18; but said space is contracted at its lower part to form shelves upon which the tire 18 may bear. If desired, the tread 7 may be filled in solid below the tire; but, as shown in Fig. 2, I have left a space below said tire of sufficient width to accommodate a semicircular rubber tire, as indicated by the dotted lines therein.

17 represents a compression-collar whose under surface is curved to fit over the inner surface of the felly 1, while the upper surface of said collar is provided with a recess to fit over the hemispherical boss 19 on the end of the thumb-screw 2. The thread of the thumb-screw 2 is arranged to work within a threaded opening in the cross-piece 3, the latter having elliptical ends, whose major diameter is vertical, as shown in Fig. 1. These elliptical ends of the cross-bar 3 are so formed for the purpose of being introduced into the elliptical openings 4 in the uprights 5, said openings having their major axes in a horizontal direction. The ends of the cross-bar 3 are turned so as to have their major axes coincide with the major axes of the openings 4 when it is desired to introduce the ends of the cross-bar into said openings, and then the cross-bar is turned about through an arc of ninety degrees, which causes the upper edge of said ends to overlap the upper edge of said opening.

9 represents a horizontal connecting-rod, having a longitudinal slot 10 to insure lightness, the forward end of said rod being pivoted on a bolt 11 to the upper forward end of the sled-runner 8. The rear end of said rod 9 is provided with forks 12, extending horizontally in the direction of the axle 20. Within these forks 12 is installed a fastening device identical in form and function with that shown as placed within the uprights 5. Said fastening means are composed of a cross-bar 14, having its elliptical ends similarly set within the elliptical openings 15 of the forks 12 and provided with a thumb-screw 13 and compression-collar (not shown) to hold and compress the felly 1 tightly against the inner face of said fork 12. It will thus be seen that when both sets of fastenings have been firmly set against the inner surface of the fellies of said wheel a strong truss connection is formed thereby through the medium of the intermediate part of the wheel, which is incapable of displacement by reason of any ordinary shock.

It will be obvious that this improved form of sled-runner can be easily attached to any wheel by simply removing the thumb-screws and cross-bars, inserting the fellies into the forks of the connecting-rod and the uprights of the runner, replacing the cross-bars in the manner heretofore described, and then inserting and screwing down tightly the thumb-screws. The connecting-rod and runners may be removed from the vehicle by reversing this operation.

As my improved sled-runners are so light and compact in arrangement, they may be stored with little loss of room or carried to and fro on the vehicle itself in order to be made use of in any emergency.

Having described my invention, what I claim as new, and desire to secure by Letters Patent, is—

In combination, a wheel rotatably mounted on a vehicle-axle, a sled-runner provided with parallel perforated uprights, an interiorly-threaded bearing-plate having its ends removably set in said perforations, a thumb-screw in said bearing-plate arranged to compress said runner against said wheel, a bifurcated connecting-rod pivoted to one end of said runner, perforations in said bifurcations, an interiorly-threaded bearing-plate having its ends removably set in said perforations, and a thumb-screw in said bearing-plate arranged to rigidly compress said wheel within the bifurcations of said rod.

Signed at Waterloo, Iowa, this 19th day of May, 1906.

FRANK BRYER.

Witnesses:
G. C. KENNEDY,
J. F. ALBRECHT.